J. R. GAMMETER.
PNEUMATIC TIRE.
APPLICATION FILED JULY 30, 1915.

1,299,167.

Patented Apr. 1, 1919.
2 SHEETS—SHEET 1.

INVENTOR.
John R. Gammeter
BY Robert M. Pierson
ATTORNEY.

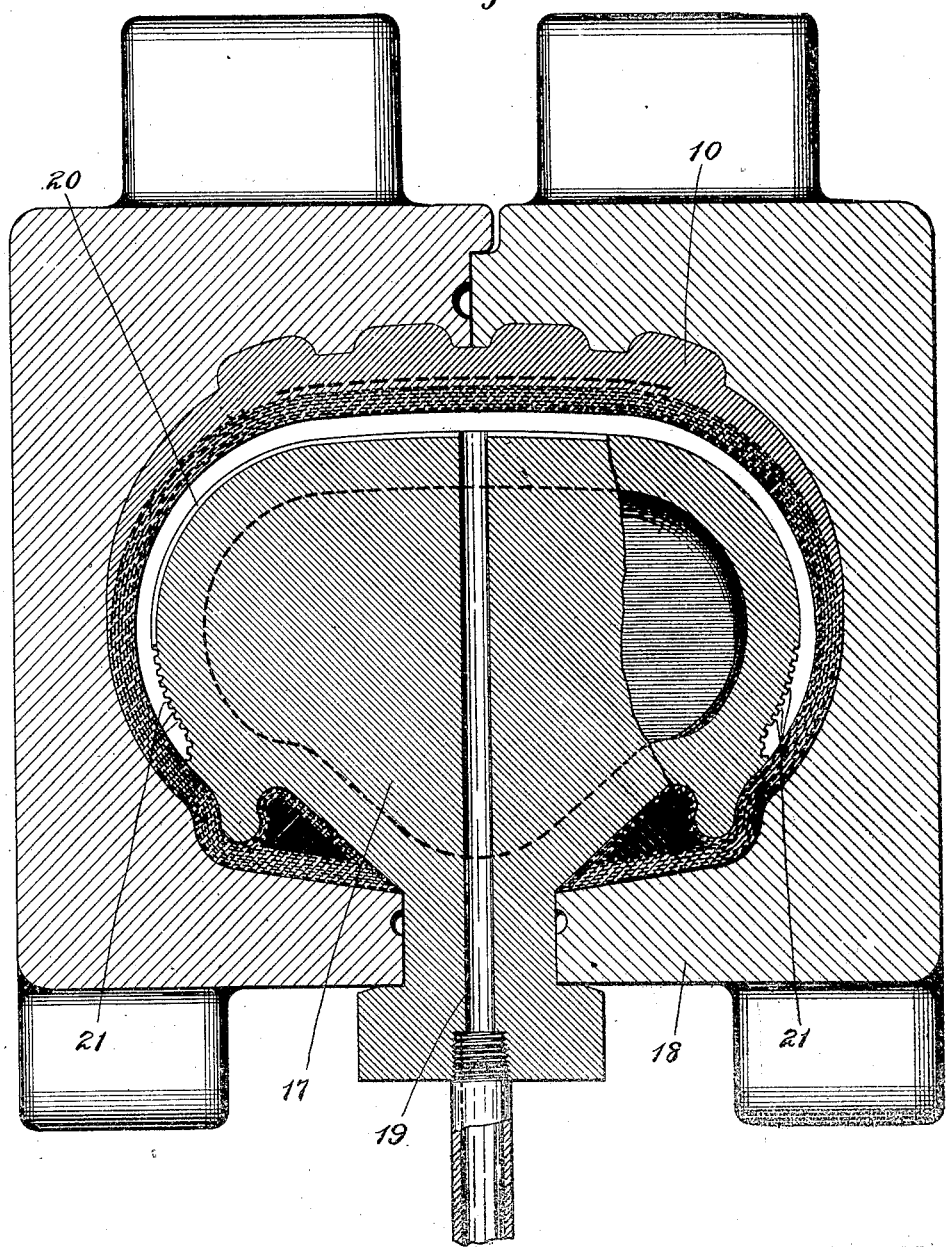

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

PNEUMATIC TIRE.

1,299,167.  Specification of Letters Patent.  Patented Apr. 1, 1919.

Application filed July 30, 1915. Serial No. 42,742.

*To all whom it may concern:*

Be it known that I, JOHN R. GAMMETER, a citizen of the United States, residing at Akron, in the county of Summit and State of Ohio, have invented certain new and useful Improvements in Pneumatic Tires, of which the following is a specification.

This invention relates to pneumatic tires of flattened or oblate section adapted to present an increased area of tread surface in contact with the ground in comparison with the usual type having a substantially circular section, thereby decreasing the amount of air pressure necessary to be carried in the tire in order to sustain a given load, and the amount of destructive strain and bending to which the walls of the carcass are subjected, increasing the durability of the rubber tread and diminishing its tendency to separate from the carcass.

In constructing such a tire, it is necessary to include in connection with the tread wall a series of flexible elements such as bands, cords, wires or fabric layers which are substantially inextensible in a circumferential direction, and a considerable problem is involved in so constructing these inextensible elements and combining them with the other elements of the tire as to provide a unified structure of maximum flexibility which will not rapidly disintegrate in service. In my Patent No. 1,188,062 of June 20, 1916, I have described a tire of this class having incorporated in its tread section a number of layers of rubberized cord each consisting of a length of cord wrapped in parallel turns circumferentially about the tire, the said cord layers being structurally incorporated in the carcass of the tire casing by being interposed between, and vulcanized to, the plies of bias fabric which also constitute the side walls of the carcass and extend into the beads; and in said patent, I have broadly claimed the invention common to it and the present disclosure. While these tires have given very satisfactory service, they are difficult to repair in case any of the cord layers should become severed by a cut or puncture, and a tire damaged in this way often has to be replaced by a complete new casing.

By means of the present invention, I overcome this difficulty and embody the basic principles of my former invention in a tire casing whose inextensible members are embodied in an endless structural element or band separate or separable from the main tire carcass, so that in case of damage by cutting, the carcass can be repaired in the ordinary manner or replaced, and the inextensible element can be separately repaired or replaced at a relatively small cost.

Furthermore, by constructing the main tire casing or its carcass so that, even when deflated, it has the oblate form which it assumes in service, preferably by making it on a core of oblate section the fabric elements of the carcass are set in the vulcanized rubber in the form necessary to properly distribute the working strains and pressures between the carcass and the inextensible element and allow the tire walls to bend in service with the least amount of internal friction and working of the cord and fabric elements in opposition to each other and to the rubber with which they are combined.

These tires are especially adapted for trucks and other heavy automobiles, and my present inventions, as disclosed in this and my aforesaid prior application, represent, so far as I am aware, the first instance of the successful production of a flat-section heavy-duty pneumatic tire.

Of the accompanying drawings,

Fig. 2 represents a sectional view of the tire casing and the mold in which it is vulcanized.

Figure 1:
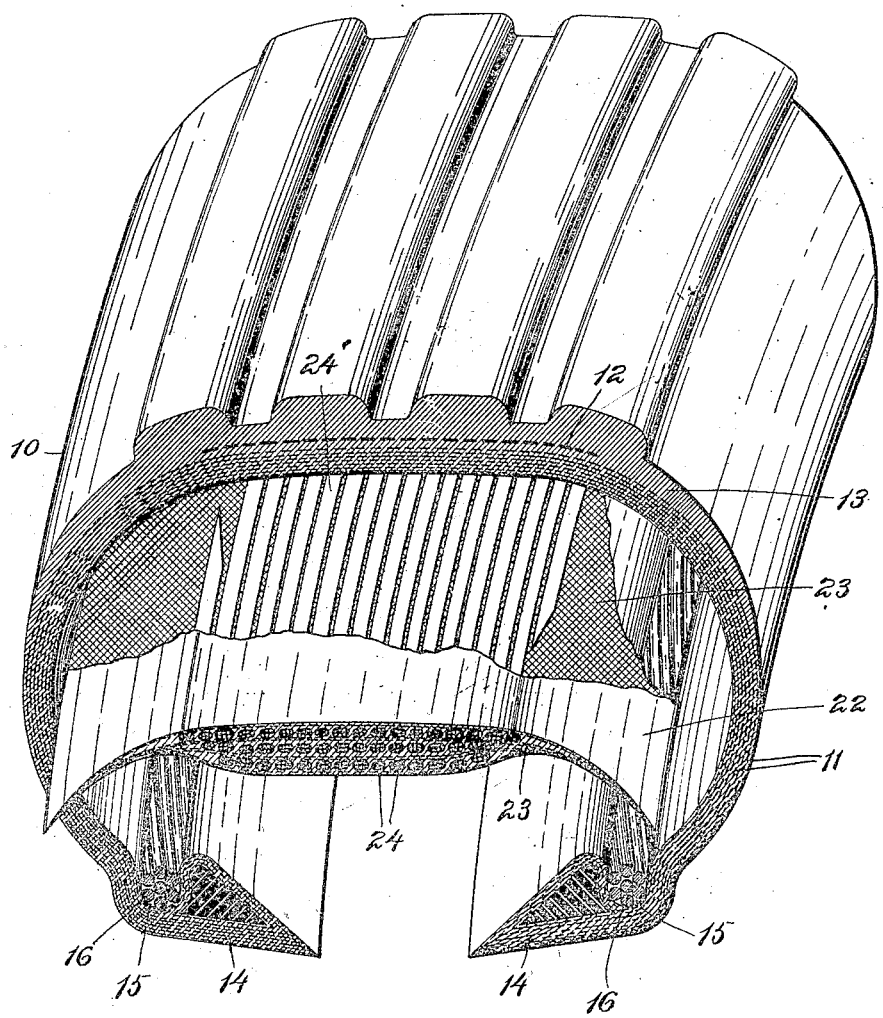
Figure 1 represents a perspective sectional view of a tire constructed in accordance with my invention, with parts of the inextensible band broken away.

In the drawings, 10 represents a tire casing whose carcass is made up of a number of plies or layers 11 of the usual frictioned woven fabric laid on the bias, but the carcass may be of any desired construction, the term "fabric" being used in a broad sense in the claims unless qualified as woven fabric. 12 is the breaker strip in the tread wall, and 13 is the outer wearing layer of rubber vulcanized on the carcass. The marginal portions or beads 14 are shown as turned inwardly and forming inwardly-open grooves 15 in which are located endless wire rings or cables 16 for securing the tire on the wheel rim, but any suitable bead construction may be employed.

The casing is preferably built in oblate form on a core 17 of suitable shape, and inclosed in an outer vulcanizing mold 18 of similar shape, as represented in Fig. 2, so that the fabric elements are disposed and set in the vulcanized rubber in approximately the form which they assume when in service, and which better adapts the tire to such service than if the carcass were vulcanized in circular form. I may, as shown, also allow a small clearance between the tire and mold at the tread and sides, and provide the core 17 with suitable means for supplying and distributing fluid under pressure into the interior of the tire during vulcanization so as to distend and stretch it, avoid wrinkles, and bring all of the fabric threads approximately to the same degree of tension, such means as shown, comprising a radial fluid-supply duct 19 traversing a partition cast in the core, a transverse distributing groove 20 on the outer surface of the core, and longitudinal distributing grooves 21 on the flanks, the inner ply of the tire having an impervious inner coating of rubber, the tire being shown in Fig. 2 in its inflated or expanded condition.

The inextensible element is an endless band 22 of which a portion is shown in Fig. 1, the same being composed of alternate layers of bias fabric 23 and flattened rubberized cords 24, each cord layer consisting of a separate length wound circumferentially in a plurality of parallel convolutions or cord elements, the two ends and the intermediate turns of the outermost cord layer being shown in Fig. 1. The number of layers, both of cord and fabric, may be varied. The band is thickened in the middle where the cord layers are placed, and the fabric layers only are extended into the margins and preferably graduated in width, so that the band tapers to thin edges at the two sides. The flattening of the cord reduces the thickness of the band, but is obviously of less importance in a band of few layers than in one of many. Said band and the carcass, when combined as shown, will form a structure resisting the outward pressure of the air-tube in all directions, enabling the tire to retain its oblate form and presenting a smooth and regular surface for the air-tube to bear against. Rubber for welding the cord and fabric layers of the band together may be provided in addition to the rubber with which they are impregnated or coated.

The band is built up on a suitable drum or mandrel, preferably collapsible, wrapped with fabric and vulcanized on said mandrel and is then removed and inserted in the carcass under the tread wall of the latter. It can be cemented in the carcass, but preferably is laid loosely therein so as to be removable in the same manner as an inner tube. The combination of inextensible cord and bias-fabric layers I have found well adapted to the severe conditions of service, especially when the loads sustained require the use of a considerable number of layers in the band, in which case it is very difficult to construct a band of sufficient strength without making one which is unduly stiff and subject to internal friction, heating and disintegration. My improved band is strong and at the same time flexible, and, in combination with a carcass vulcanized in oblate form, it is well adapted to give the advantages set forth in the introduction.

I claim—

1. The combination of a substantially inextensible pneumatic tire casing adapted to resist the internal air pressure and open along its inner circumference, a removable elastic inner air-tube adapted to bear outwardly against the sides of said casing, and a structurally-separate circumferentially-inextensibile endless band confined against the inner surface of the tread-wall of the casing by the pressure of the air tube against the sides of the latter, for maintaining the tire in an oblate cross-sectional form when inflated, the body of said band being substantially flat transversely and comprising circumferentially-extending strain-resisting cord elements.

2. The combination of a substantially inextensible pneumatic tire casing adapted to resist the internal air pressure and cured in an oblate cross-sectional form substantially the same as its inflated form, said casing being open along its inner circumference, a removable elastic inner air-tube adapted to bear outwardly against the sides of the casing, and a structurally-separate inextensible transversely-flat endless band comprising circumferentially-extending cord elements and confined against the inner surface of the tread-wall of the casing by the pressure of the air-tube against the sides of the latter, for maintaining the oblate form of the tire when inflated.

3. The combination of a substantially inextensible pneumatic tire casing adapted to resist the internal air-pressure and open along its inner circumference, said casing having a substantially-flat tread wall and curved sides, a structurally-separate, circumferentially-inextensible endless fibrous band having a transversely-flat relatively-thick body and relatively-narrow tapered edges and positioned against the inner surface of the tread-wall of the casing, and a removable elastic air-tube bearing outwardly against said band and against the sides of the casing for transversely expanding the latter and holding its tread wall inwardly against the band, whereby the inflated tire is maintained in an oblate cross-sectional form.

4. An endless tread band for insertion between the casing and air tube of a pneumatic tire, said band having a transversely-flat, relatively-thick middle body comprising circumferentially-extending inextensible cord elements, and terminating in relatively-narrow tapered side edges so as to cover substantially only the inner side of the tread-wall of the tire and maintain the latter in an oblate cross-sectional form.

5. An endless substantially-inextensible tread-band for insertion between the casing and air tube of a pneumatic tire, said band having a transversely-flat, relatively-thick middle body comprising rubberized circumferentially-extending cord elements, and rubberized woven-fabric cover plies forming relatively-narrow tapered margins.

In testimony whereof I have hereunto set my hand this 29 day of July, 1915.

JOHN R. GAMMETER.